US007988345B2

(12) United States Patent
Rosenhahn et al.

(10) Patent No.: US 7,988,345 B2
(45) Date of Patent: Aug. 2, 2011

(54) PROJECTION MODULE OF AN AUTOMOBILE HEADLIGHT

(75) Inventors: Ernst-Olaf Rosenhahn, Bodelshausen (DE); Ralf Ackermann, Kirchentellinsfurt (DE); Ulrike Schloeder, Reutlingen (DE); Henning Weinhold, Gomaringen (DE); Benjamin Stauβ, Reutlingen (DE)

(73) Assignee: Automotive Lighting Reutlingen GmbH (DE)

(*) Notice: Subject to any disclaimer, the term of this patent is extended or adjusted under 35 U.S.C. 154(b) by 197 days.

(21) Appl. No.: 12/201,482

(22) Filed: Aug. 29, 2008

(65) Prior Publication Data

US 2010/0002460 A1 Jan. 7, 2010

(30) Foreign Application Priority Data

Aug. 29, 2007 (DE) ........................ 10 2007 040 760

(51) Int. Cl.
*B60Q 1/00* (2006.01)

(52) U.S. Cl. ........ 362/538; 362/521; 362/522; 362/543; 362/544; 362/545

(58) Field of Classification Search .................. 362/538, 362/528, 521, 522, 545, 543, 544, 509, 539
See application file for complete search history.

(56) References Cited

U.S. PATENT DOCUMENTS

| | | | | |
|---|---|---|---|---|
| 6,224,245 | B1 * | 5/2001 | Boebel | 362/509 |
| 6,619,825 | B2 * | 9/2003 | Natsume | 362/509 |
| 7,540,638 | B2 * | 6/2009 | Dassanayake et al. | 362/465 |
| 2004/0208020 | A1 * | 10/2004 | Ishida | 362/545 |
| 2005/0219856 | A1 * | 10/2005 | Tatsukawa | 362/507 |
| 2005/0265035 | A1 * | 12/2005 | Brass et al. | 362/451 |
| 2007/0263402 | A1 * | 11/2007 | de Lamberterie | 362/509 |
| 2008/0043485 | A1 * | 2/2008 | Koerner et al. | 362/521 |
| 2009/0262546 | A1 * | 10/2009 | Stefanov et al. | 362/507 |

* cited by examiner

*Primary Examiner* — Evan Dzierzynski
(74) *Attorney, Agent, or Firm* — Donald R. Boys; Central Coast Patent Agency, Inc.

(57) ABSTRACT

The invention relates to a projection module of an automobile headlight. The module includes several semiconductor light sources to broadcast optical irradiation of a primary optics assembly to bundle the emitted irradiation, and a secondary optics assembly that projects the bundled irradiation to create the desired light distribution in front of the vehicle. In order to reduce the weight and dimensions of the projection module, it is proposed that the secondary optics assembly is formed as a multi-part complex lens that includes several lens segments. Each of these lens segments is assigned to at least one irradiation bundle of irradiation bundled from the primary optics assembly, and projects this assembly as partial distribution in front of the vehicle, whereby the overall distribution of the projection module results from overlapping the partial distributions.

17 Claims, 6 Drawing Sheets

State of the Art

PROJECTION MODULE OF AN AUTOMOBILE HEADLIGHT

CROSS-REFERENCE TO RELATED DOCUMENTS

Figure 1:
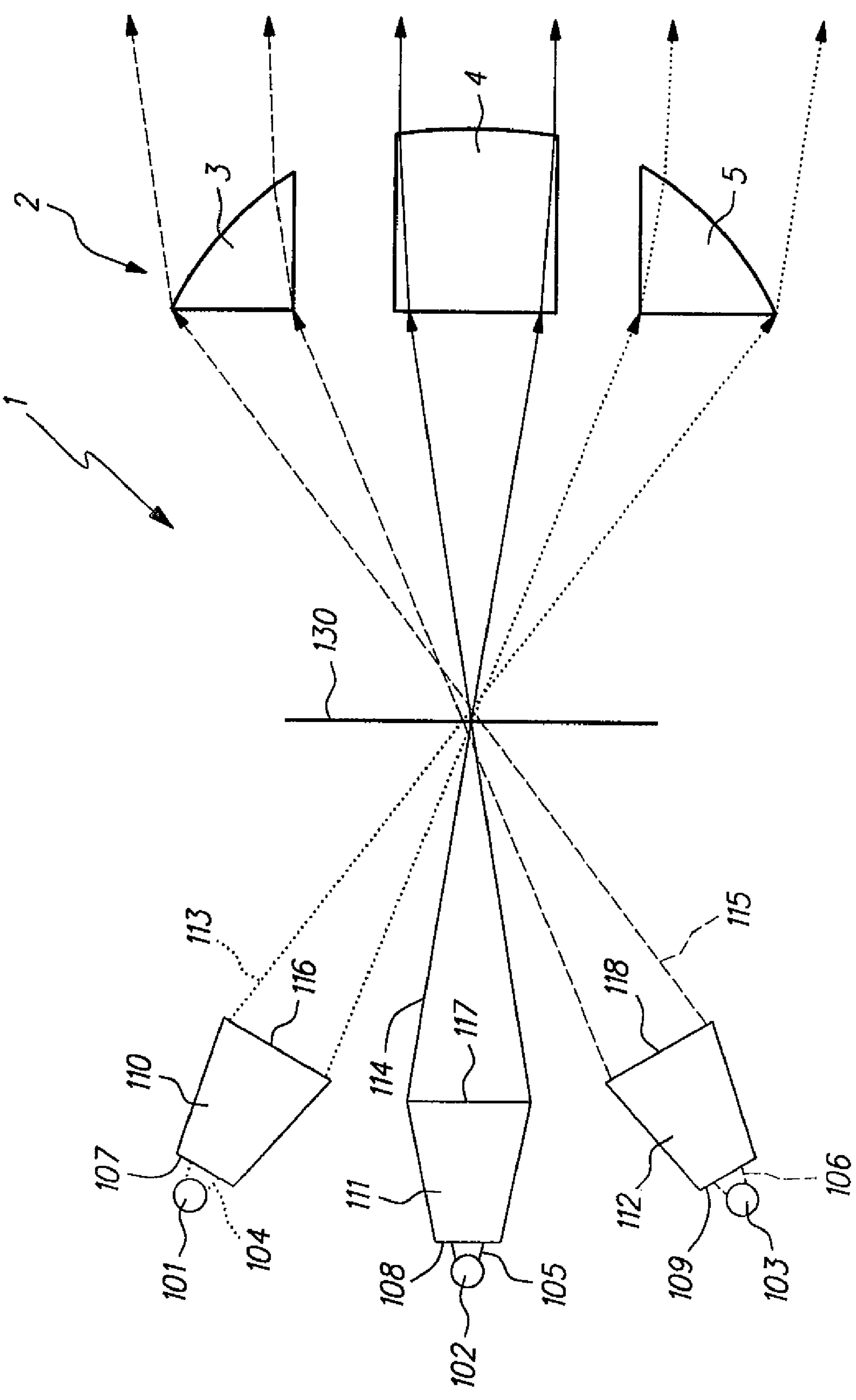

The present application claims priority to a German patent application serial number DE 10 2007 040 760.4, which was filed on 0812912007, which is incorporated herein in its entirety, at least by reference.

DESCRIPTION

The invention relates to a projection module of an automobile headlight. The module includes:

several semiconductor light sources to broadcast optical irradiation, preferably in a visible range of the spectrum, a primary optics assembly to bundle at least a portion of the emitted irradiation, and a secondary optics assembly that projects the bundled irradiation to create the desired light distribution in front of the vehicle.

Such projection modules are known from the State of the Art. They usually use light-emitting diodes (so-called LED's) that emit white light. In order to be able to achieve higher illumination values within the light distribution, an LED projection module usually possesses several LED's as light source that are positioned at a distance from one another. To bundle the irradiation emitted by the LED's, so-called front optics positioned in front of the LED's along the light-emitting direction and made of glass or a transparent plastic have proved themselves. The irradiation emitted from the LED's enters the front optics and is converted so that it exits the front optics bundled.

In the case where the projection module creates a low-beam distribution, particularly with a light-dark line limiting the light above it, the conventional projection module also possesses a baffle assembly in the beam path between the primary optics assembly and the secondary optics assembly. This includes a baffle with an upper edge and at least one baffle element. The baffle element may be displaceable to switch between various illumination functions, e.g., foldable to switch between high-beam and low-beam headlights, namely about a rotational axis extending approximately horizontally. Likewise, the baffle assembly may include several baffle elements that are displaceable with respect to one another about a rotational axis that is parallel to the optical axis and at a distance from this rotational axis, whereby the upper edge of the baffle assembly is formed by the overlapping of the optically-active upper edges of the individual baffle elements. A baffle assembly is also required to generate the light-dark line for other illumination functions such as, for example, fog lamps, inclement-weather lamps, city running lights, highway lights, or expressway lights. If the projection module, however, creates only one high-beam distribution, a baffle assembly is not required.

Finally, the projection module possesses a secondary optics assembly that projects the beams bundled by the primary optics and, if a baffle assembly is present, the beams passing by it, onto the roadway before the vehicle. According to the State of the Art, the secondary optics is normally formed as a single, not subdivided, essentially plano-convex lens (refractive optics; aspherical lens). The thickness of secondary optics thus formed is essentially dependent on their diameter for specific optical characteristics. This means that particularly secondary optics with a large diameter must have a relatively great thickness that in turn leads to large-dimensioned headlamps. Additionally, the secondary optics that as a rule is formed as one piece of relatively heavy glass or plastic represents a considerable portion of the overall weight of the projection module.

The trend toward ever-smaller and lighter projection modules for automobile headlamps has not included the part of the module that represents a significant portion of the total weight of the module. The reason for this is the laws of optics that make a one-piece configuration of the lens inconvenient, and the high requirements for heat resistance of materials used that allows only the use of relatively heavy glass or special plastics.

Starting from the described State of the Art, it is the task of the invention to configure and expand a projection module for an automobile headlight such that the module is as small as possible, and is particularly lighter than previous projection modules.

To solve this challenge, starting from the projection module described at the outset it is proposed that the secondary optics assembly is formed as a single one- or multi-part complex lens possessing several lens segments, whereby each of the lens segments is assigned to at least one beam bundle of the irradiation bundled from the primary optics assembly, and it projects a desired partial distribution before the vehicle, whereby the overall light distribution of the projection module results from the overlapping of partial light distributions.

In projection headlights with a conventional light source such as, for example, an incandescent bulb, a gas-discharge lamp, or a light-decoupling surface of a fiber-optic conductor, practically the entire cross-sectional area of the secondary optics is illuminated. The inventors recognize that is otherwise in projection module headlights with multiple semiconductor sources based on the invention. There, because of the arrangement of the individual light sources at a distance from one another and the quasi-point shaped configuration of the light sources, the secondary optics is not illuminated across its full surface, but rather only in specific sections of the irradiation emitted from the individual light sources. The areas between the illuminated sections of the secondary optics are not required to create the light distribution of the projection module. For this reason, it is proposed to eliminate these areas so that the secondary optics assembly includes several discrete lens elements formed separately from one another. Based on the invention, the secondary optics assembly has thus been altered based on the slogan: "As little as possible, but as much as necessary." Since the secondary optics is generally a massive component of relatively heavy glass or plastic (if heat resistant), this leads to a considerable weight savings without light loss in comparison to conventional, one-piece, aspherical lenses. This is particularly possible by means of a suitable configuration of the LED front optics and the complex lens along with suitable positioning of the LED's front optics, baffles, and complex lenses.

Also, a segmented lens, or many smaller lenses, represents an important design aspect. Segmenting of the secondary optics assembly also has the advantage that, depending on design preference, the individual segments may be positioned optionally (e.g., one above the other, one next to another, along a curve, following the headlight shape, in a V, in a circle, etc.). Thus, the identical light distribution may be created on the roadway as with a conventional non-segmented projection lens. One thus obtains additional degrees of design freedom without altering the light output performance of the projection module.

According to an advantageous expansion of the invention, it is proposed that the projection module includes at least one baffle assembly positioned within the beam path of the bundled irradiation with an upper edge, whereby a secondary optics assembly projects the irradiation passing by the baffle onto the roadway in front of the vehicle, and projects the upper edge as the light-dark line onto the roadway in front of the vehicle. The projection module based on the invention thus serves not only to generate a high beam, but rather may also be used to create a light distribution with an upper light-dark line.

It is conceivable for the primary optics assembly to include a front optical system that may be formed as a normal reflector to bundle the light beams emitted from the light sources. According to a particularly advantageous embodiment example of this invention, it is proposed, however, that the primary optics assembly includes at least one front optical system that is positioned within the beam path of the irradiation emitted from the light source, and which bundles the emitted irradiation, for example by means of total reflection. While reflectors are used as a rule a primary optics to bundle the irradiation emitted by the light sources in conventional projection modules with conventional light sources, e.g., incandescent bulbs or gas-discharge lamps, the projection module based on this embodiment of the invention use front optical systems that are also known as collector optical systems. These front optical systems are normally formed as one piece, and consist of glass or a suitable transparent plastic. They include a light coupling surface facing toward the semiconductor light source. The irradiation emitted by the light source passes through the coupling surface into the front optical system, is totally reflected there, and then exits from one or several light decoupling surfaces of the front optical system in bundled form. It is conceivable that several semiconductor light sources share a common front optical system. Although in that case the irradiation emitted from several light sources passes through the same front optical system and is bundled by it, the bundled irradiation emerges from the front optical system essentially in discrete light bundles that then strike the lens segment of the secondary optics assigned to it. Thus, a discrete light bundle is emitted through light source unit consisting of the semiconductor light source and its assigned front optical system, which exactly passes through the lens segment of the secondary optics unit assigned to it. It is, of course, conceivable for minor portions of the light bundle do not strike the lens segments and are lost or otherwise used.

According to a preferred embodiment of the invention, the light segments of the secondary optics assembly are various segments of the same secondary optics assembly, particularly of the same projection lens. This means, therefore, that the secondary optics in the form of a projection lens has been sub-divided into light segments, and the unused areas of the lens positioned between them, i.e., the areas through which no, or only very small, portions of the light bundles pass have been removed. For this, the light segments possess the identical optical characteristics as the corresponding sections of the original projection lens. The light segments of the secondary optics assembly preferably possess the same focal lengths.

According to an alternative embodiment of the invention, it is proposed that the light segments of the secondary optics assembly are various segments of variously-shaped projection modules. According to this alternative, the secondary optics is not merely sub-divided into lens segments. Rather, the positioning of the light segments, corresponding to the areas of the original projection lens through which the light bundles pass, remains largely unaltered. The shapes, and particularly the optical characteristics of the individual light segments are varied, however, in order better to be able to achieve a desired light distribution. Particularly large free spaces result during the configuration of the projection module and the realization of a desired light distribution.

The light segments of the secondary optics assembly preferably include varying focal lengths. It is proposed that the light segments arranged by focal length follow the shape of the automobile headlight, or the shape of a headlight cover plate as seen from above. In this manner, the shape of the secondary optics assembly may be matched to the shape of the cover plate of the automobile headlight so that the projection module and/or the headlight may be designed to be particularly short.

In particular, the individual light segments are of differing thickness. The light segments in the vicinity of the optical axis of the projection module may be formed with less thickness than those positioned at a greater distance from the optical axis. Since in conventional projection lenses the area near the optical axis are the thickest, and many times thicker than the edge areas, the proposed configuration of the light segments can lead to a significant reduction, which has a positive effect on the dimensions and weight of the projection module. Particularly small-dimensioned headlights may be realized in this manner. The thickness of a light segment may even be reduced while maintaining the optical characteristics of the corresponding section of the original projection lens. It is even conceivable that the thickness of at least one of the light segments positioned in the vicinity of, or near, the optical axis of the projection module of the secondary optics assembly in comparison to the light segments positioned at a greater distance from the optical axis be reduced.

Based on an advantageous expansion, it is proposed that the light segments of the secondary optics assembly be mounted in an array against the exit direction of the irradiation from the projection module, i.e., in the plane perpendicular to the optical axis. The arrangement of the individual light segments is basically dependent on the position where the light bundles from the individual semiconductor light sources and/or from the light source units intersect a plane of the secondary optics assembly. It is not necessarily so that a light segment be assigned to the opposing light source and/or to the opposing light source unit, but rather is entirely possible that the light bundles from the various light sources or light source units on their path to the plane of the secondary optics assembly intersect, or skewed with respect to one another. It is thus conceivable that the light segment be positioned below and to the left of the light source along a particular line of sight, or above and to the right of the light source unit, or any other option.

The segmented complex lens of the secondary optics assembly is preferably formed as a single component. Connections between the light segments as an integral component of the complex lens may be provided, e.g., in the form of connecting spars, or in the form of a separate lens holder to which the individual segments are attached. This offers the advantage that the secondary optics assembly need only be matched to one baffle arrangement in spite of the segmenting, and thus only one adjustment of the light-dark line need be performed. Particularly, the expensive adjustment of X light sources with X baffles relative to X light segments may be avoided.

Figure 2:
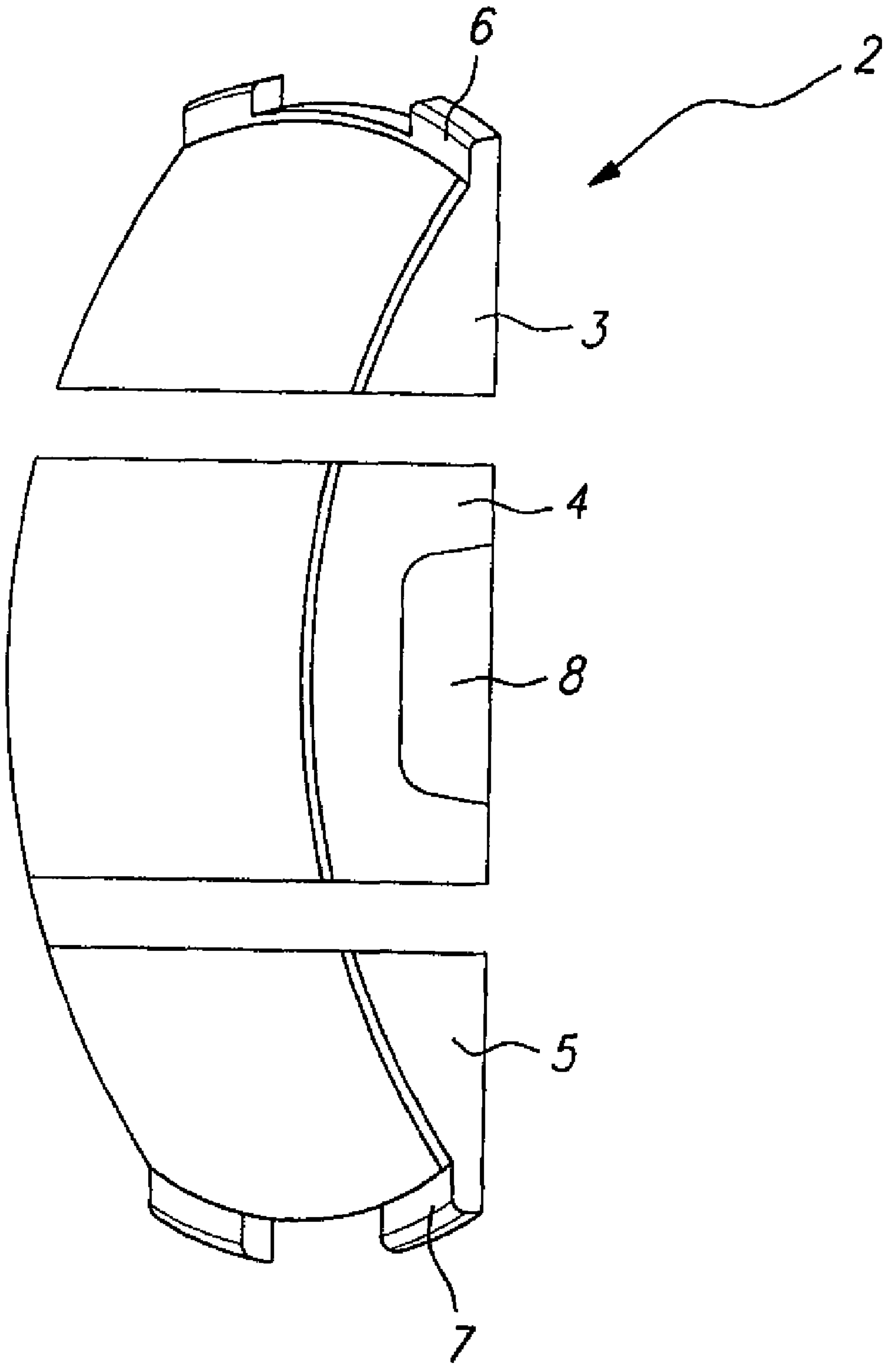
Figure 3:
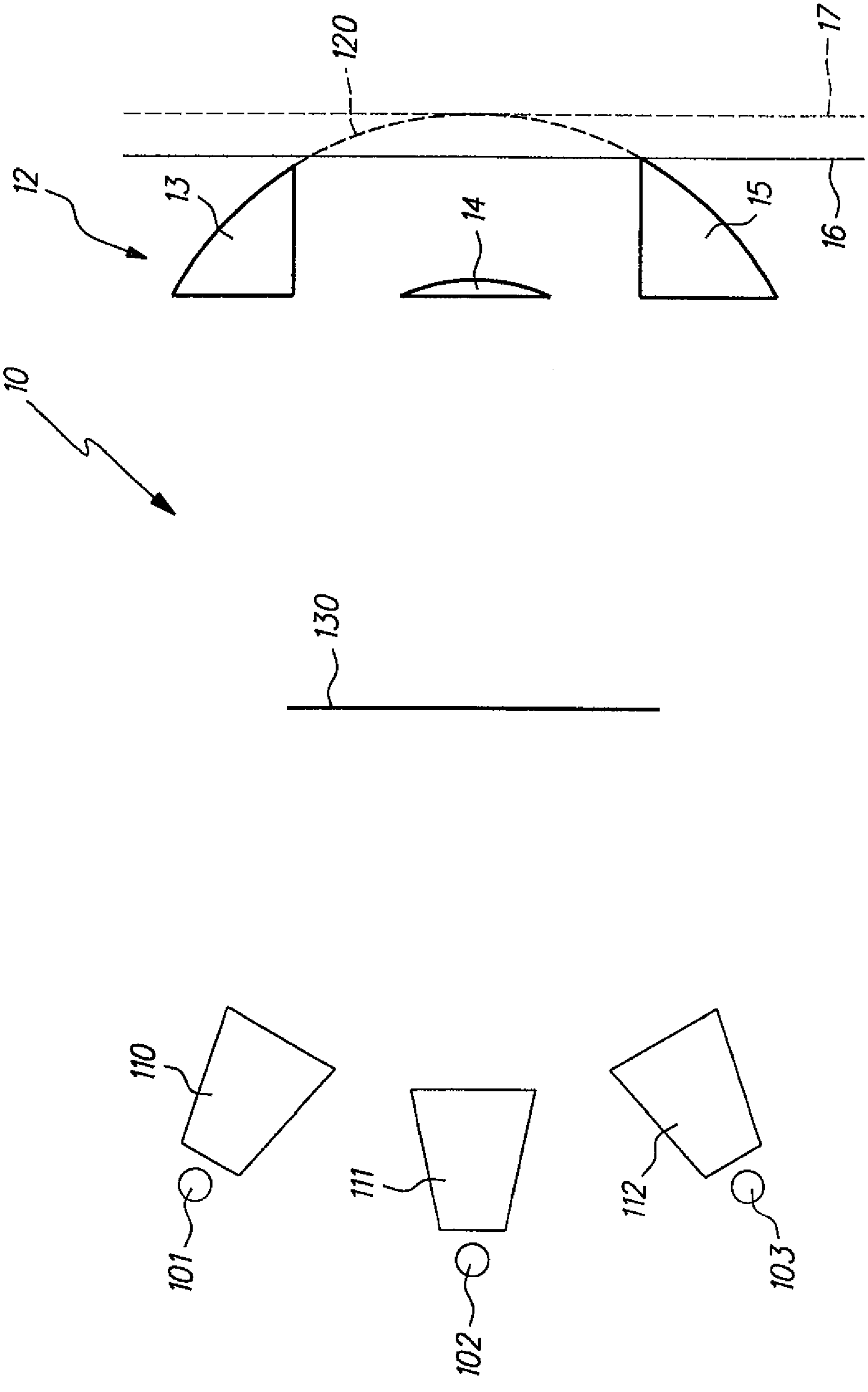
Figure 4:
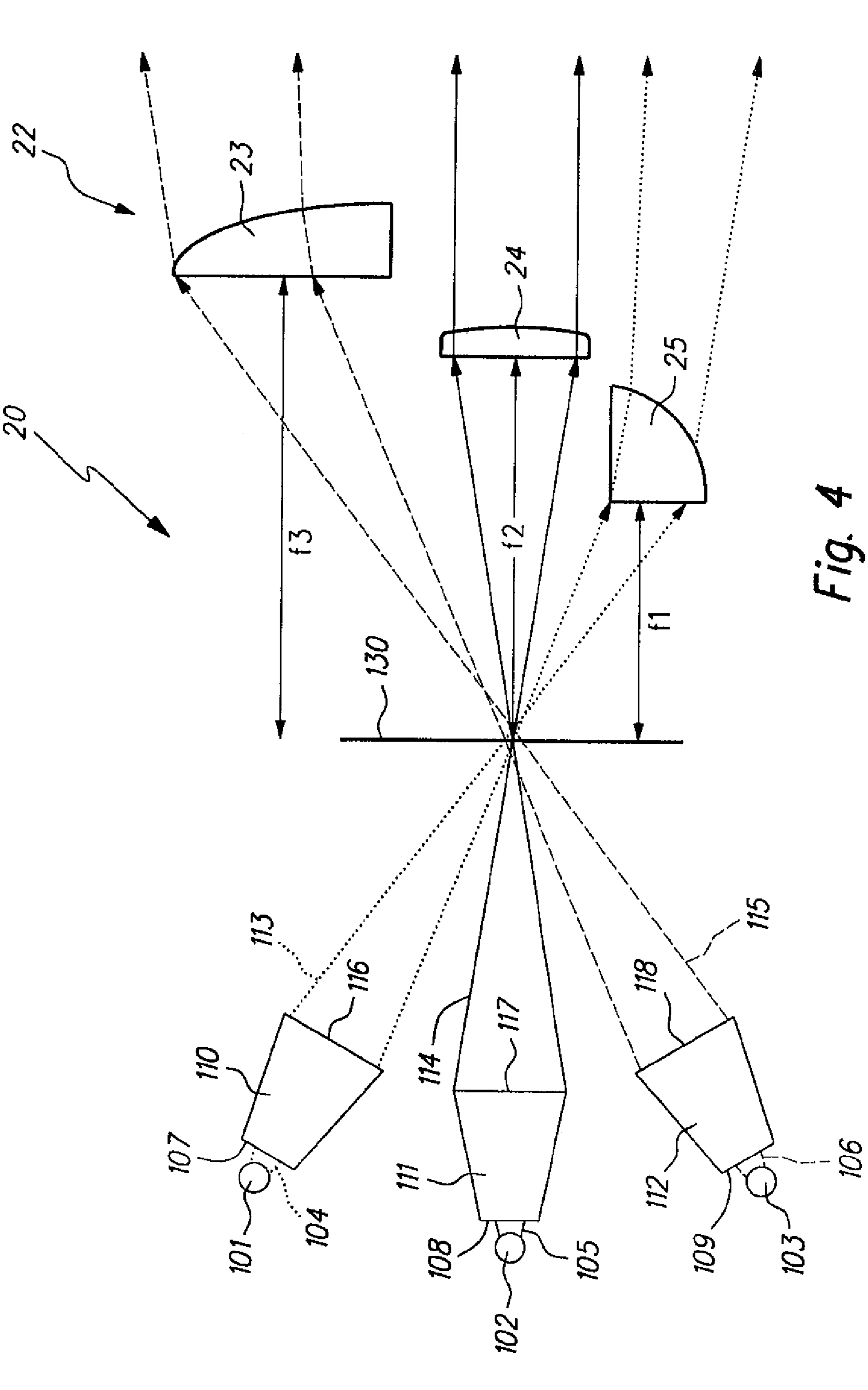
Figure 5:
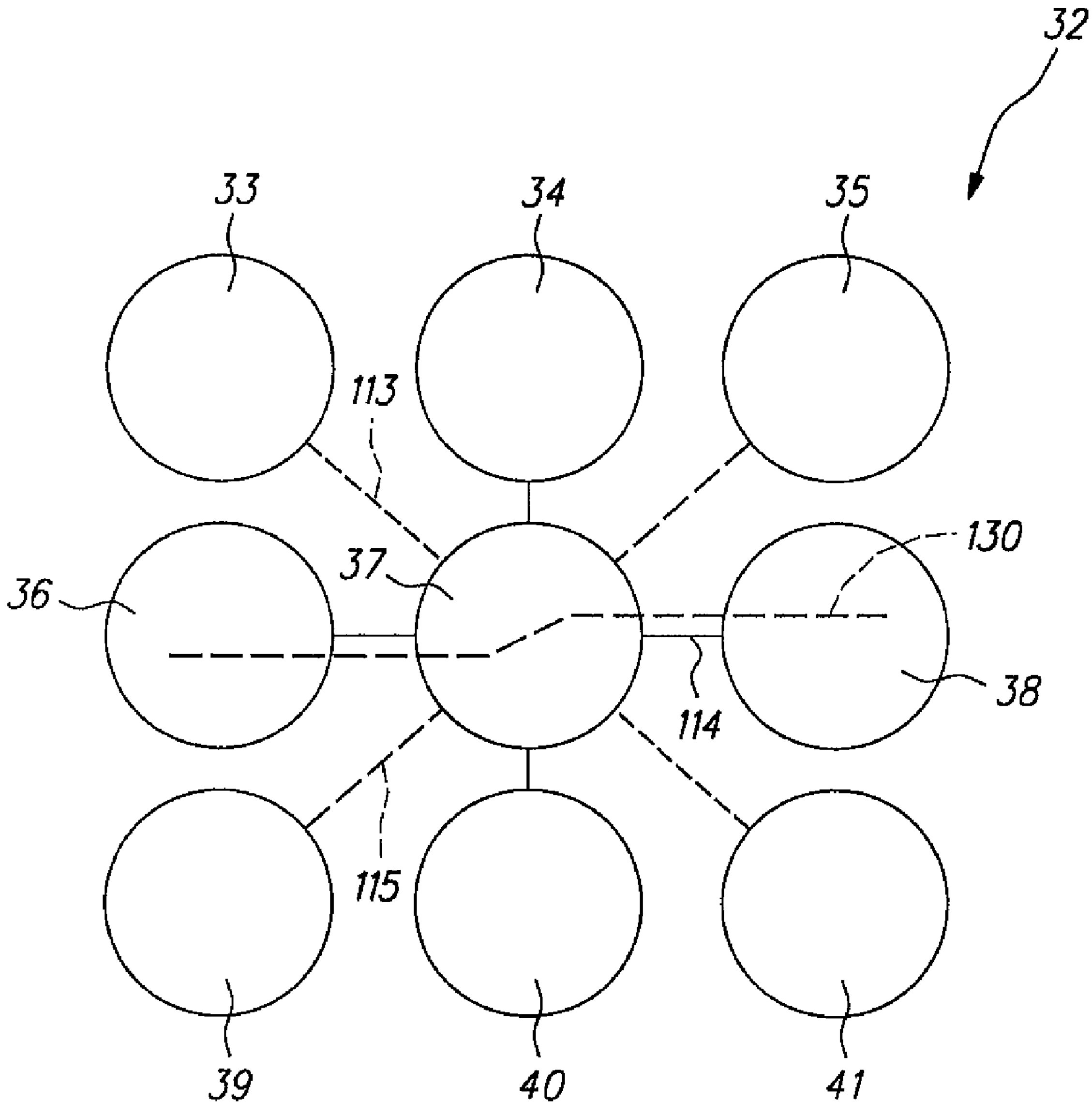
Figure 6:
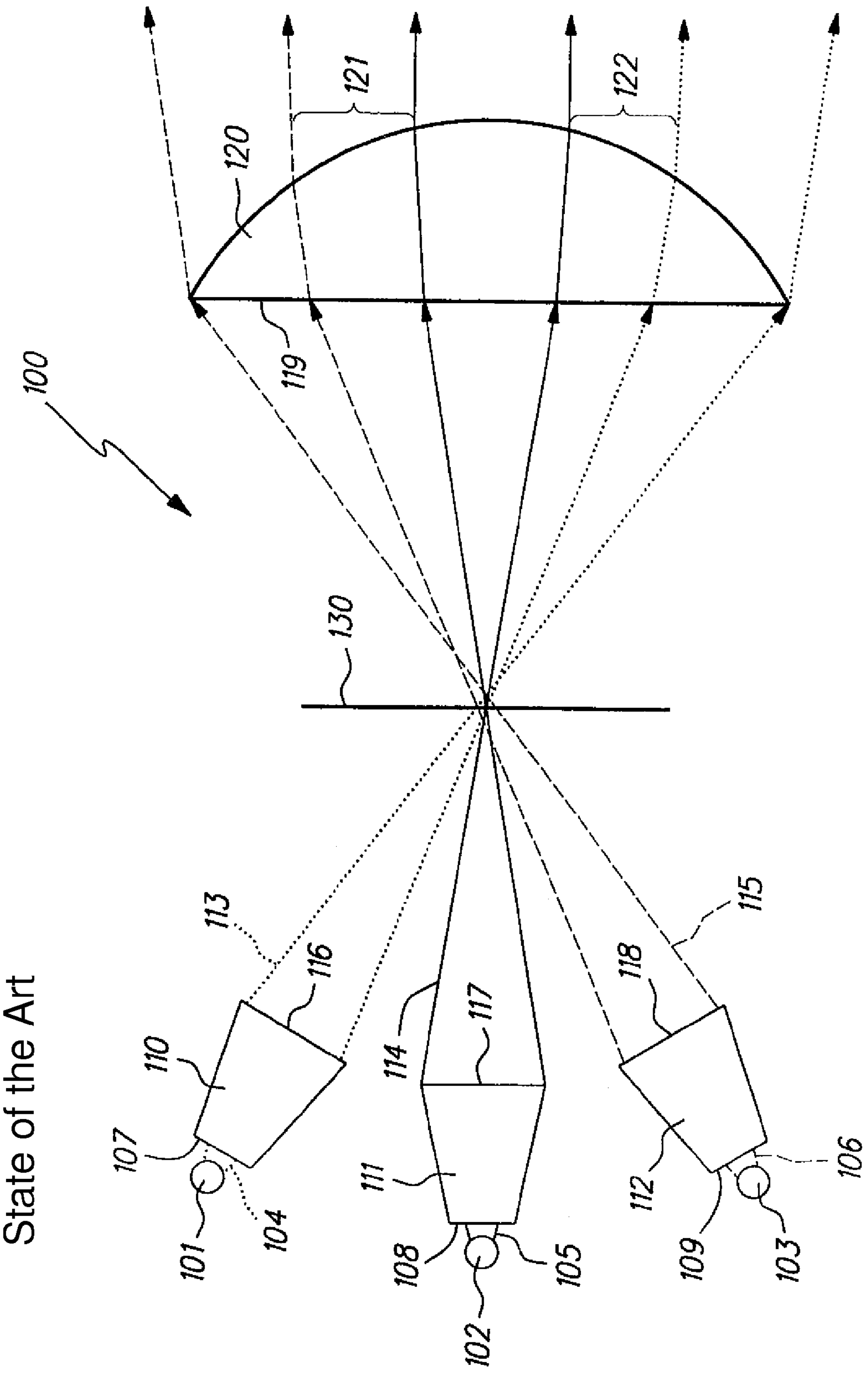

In the following, advantageous embodiments of the invention will be described in greater detail using Figures, which show:

FIG. 1 top view of a projection module based on the invention of an automobile headlight according to a first embodiment example;

FIG. 2 perspective view of a secondary optics assembly of the projection module based on the invention from FIG. 1;

FIG. 3 top view of a projection module based on the invention of an automobile headlight according to a second embodiment example;

FIG. 4 top view of a projection module based on the invention of an automobile headlight according to a third embodiment example;

FIG. 5 frontal view of a secondary optics assembly of a projection module based on the invention, against the direction of light emission exit; and FIG. 6 projection module known from the State of the Art.

This invention relates to the realm of headlights, particularly for automobiles. The headlights considered here include at least one projection module. Along with the minimum of one projection module, the headlights may include other projection modules, reflection modules, and/or illumination modules, whereby all modules of the headlight are preferably mounted in a headlight housing.

FIG. 6 shows a State-of-the-Art projection module designated overall with reference index 100. It includes several light sources 101, 102, 103 that are formed as point-type illumination diodes positioned at a distance from one another. The illumination diodes 101, 102, 103 emit light beams that are designated with 104, 105, 106. The emitted light beams 104, 105, 106 each strike a light-coupling surface of a front optical system 110, 111, 112. The front optical systems 110, 111, 112 may also be designated as a primary optics assembly. The front optical systems 110, 111, 112 are of one piece, and are made of glass or plastic. The coupled light beams are totally reflected and bundled therein. The light bundles 113, 114, 115 exit from a decoupling surface 116, 117, 118 of the front optical system 110, 111, 112.

At least a major portion of the light bundles 113, 114, 115 strikes a flat side of a projection lens 120. The lens 120 may also be designated as secondary optics assembly. The lens 120 projects the light bundles 113, 114, 115 onto the roadway before the vehicle. A baffle assembly 130 is positioned between the primary optics assembly 110, 111, 112 and the secondary optics 120 that shadows a portion of the light bundles 113, 114, 115 on their way to the projection lens 120. The baffle includes an upper edge that is projected through the lens 120 onto the roadway as the upper light-dark line of the light distribution. The baffle 130 may be displaceable, particularly foldable about a rotation axis that is essentially horizontal and perpendicular to the optical axis in order to switch between low-beam headlights (baffle 130 in beam path) and high-beam headlights (baffle 130 removed from beam path). The baffle 130 includes at least one baffle element. In a multi-part baffle, the upper edge is formed by an overlap of the optically-active upper edges of the individual baffle elements. The baffle elements may be pivotable about a rotation axis essentially horizontal, essentially parallel, and at a distance from the optical axis. In this manner, adaptive light distribution may be created that varies the light distribution depending on the driving situation, as for example poor light from inclement-weather, city lights, highway lights, expressway lights, etc.

FIG. 6 clearly shows that the arrangement and configuration of the light sources 101, 102, 103 and the front optical systems 110, 111, 112 of the conventional projection module 100 is selected such that the light bundles 113, 114, 115 illuminate only limited sections of the projection lens 120. The technically unused areas of the projection lens 120 through which no, or only very little, light, e.g., scattered light passes are designated in FIG. 6 with reference indices 121 and 122. Although the projection lens 120 of the conventional projection module 100 uses only a portion of the lens 120, and/or requires a portion of it to create the light distribution, then for weight reasons, the entire projection lens 120 must be taken into account for the overall weight of the module 100. Also, the lens 120 is relatively thick.

These disadvantages of the conventional projection module 100 are to be removed by this invention. FIG. 1 shows a projection module based on the invention that is designated overall with reference index 1. Equivalent components are designated in all Figures with identical reference indices. The semiconductor light sources 101, 102, 103 emit electromagnetic irradiation, preferably in a visible-wavelength range of the spectrum. It is also conceivable, however, that the light sources 101, 102, 103 emit ultra-violet (UV) or infra-red (IR) irradiation, e.g., as irradiation source for a night-vision device.

The module 1 distinguishes itself from the known module 100 particularly by the special configuration of the secondary optics assembly 2. This is formed in the invention as a complex lens with a number of lens segments 3, 4, 5. Based on their position and dimensions, the segments 2, 3, 4 essentially correspond to the sections of the projection lens 120 of the known module 100 that lie outside the unused areas 121, 122 of the lens 120. The optical characteristics of the light segments 3, 4, 5 and/or of the secondary optics assembly 2 of the projection module 1 based on the invention is exactly the same as those of the lens 120 of the known projection module 100. The advantage of the module 1 from FIG. 1 is particularly the weight savings that results from the omission of unused areas 121, 122 of the projection lens 120. Since the secondary optics assembly of one-piece glass or plastic represents a considerable portion of the module's overall weight, a particularly light-weight projection module 1 results without altering the basic light distribution on the roadway, particularly without technical optical losses caused by weight reduction.

The secondary optics assembly 2 of the projection module 1 based on the invention is shown enlarged in FIG. 2. One may recognize that the secondary optics assembly 2 consists of three light segments 3, 4, 5 placed one above the other. Of course, the quantity and positioning of the light segments may vary greatly. It is conceivable, for example, for several light segments to be positioned as a matrix in several rows and columns, offset with respect to one another as necessary. Many other configurations are conceivable.

FIG. 5 shows, for example, an embodiment example in which the secondary optics assembly 32 includes a total of nine light segments 33 through 41 that are mounted in three rows and three columns with no offset. The asymmetrical upper edge of the baffle assembly 130 is shown using a dashed line. Individual light bundles are designated 113, 114, 115, and shown as examples in FIG. 5. A Light-Emitting Diode (LED) module with three LED's is assigned to the illustrated secondary optics assembly 32. However, the use of LED modules otherwise-configured is also conceivable. In the embodiment example in FIG. 5, the quantity of light bundles matches the quantity of LED's. It is conceivable for the quantity of optical elements and, finally, also the quantity of light segments, to match the quantity of LED's. In this case, an optical element and a light segment are assigned to each LED. It is thus possible in a particularly simple way to realize adaptive light distribution. Of course, it is also conceivable that several LED's share an optical element and/or a light segment.

In order for the light segments 3, 4, 5 in FIG. 2 to better be secured in a lens holder or similar, they include securing elements that are formed as projections 6, 7 on the upper and lower light segments 3, 5. For the central light segment 4, the securing elements are formed as recesses. Of course, the securing elements 6, 7, 8 may be formed in many other ways.

FIG. 3 shows an additional embodiment example of the projection module 10 based on the invention. For the sake of better visibility, the light bundles are not included. In this example also, equivalent components are designated with identical reference indices. This embodiment example differs from the first embodiment example in that the light segments are formed not as segments of the same projection lens, but rather as segments of different projection lenses as necessary with different optical characteristics. One may recognize this by the diameters of the light segments 13, 14, 15 differing from those of the original projection lens (dashed line 120). The light segment 14 particularly near the optical axis of the projection module 10 possesses a significantly reduced thickness than the corresponding area of the original projection lens 120. The thickness of the central light segments 14 is even less than the thickness of the outer light segments 13, 15 located farther from the optical axis. The depth of the projection module 10 based on the invention 10 ends at the front at the drawn line 16, whose position is dictated by the lower light segment 15. The conventional projection module 100 ended a little farther forward at the dashed drawn line 17, whose position is dictated by the thickest part of the original projection lens 120. One may also clearly see that, along with weight savings, this embodiment also possesses clear advantages regarding the dimensions of the projection module 10. The focal lengths of the light segments 13, 14, 15 are preferably of the same size although the dimensions of the segments 13, 14, 15 of the projection module 10 based on the invention were altered with respect to the original projection lens 120 and/or with respect to sections of the lens 120 through which the light bundles are transmitted.

FIG. 4 shows an additional embodiment example of the invention. The projection module of this example is designated overall with reference index 20. In this example also, equivalent components are designated with identical reference indices. In contrast to the previous embodiment examples, the light segments 23, 24, 25 of the secondary optics assembly 22 are with different optical characteristics, particularly with different focal lengths f1, f2, f3. Since the baffle assembly 130 is advantageously positioned in the area of a focal point of the projection lens 120, as many as possible of the focal points of the light segments 23, 24, 25 should still lie in the vicinity of the baffle assembly 130. This is possible with the embodiment example shown in FIG. 4, thanks to different focal lengths, although the segments 23, 24, 25 are at different distances from the baffle assembly 130. In the embodiment example in FIG. 4, the focal lengths f1, f2, f3 of the light segments 23, 24, 25 may even be selected such that they may follow the front contour of a headlight, particularly the cover plate of the headlight. In this manner, considerable installation space may be achieved, particularly in modern vehicles with strongly convex cover plates, since the projection module 20 may be positioned tightly to the cover plate within the headlight housing.

The invention claimed is:

1. Projection module of a headlight on a vehicle, said module comprising:

multiple semiconductor light sources emitting optical irradiation within the visible range of the spectrum;

a primary optics assembly bundling at least a portion of the emitted optical irradiation;

a secondary optics assembly that projects the bundled optical irradiation to create a light distribution in front of the vehicle; and at least one baffle positioned in the beam path of the bundled irradiation with an upper edge;

characterized in that the secondary optics assembly is formed as a complex lens that possesses a plurality of lens segments each of the lens segments positioned apart from each other and assigned to at least one irradiation bundle assigned to at least one irradiation bundle of the irradiation bundled by the primary optics assembly and projects the irradiation from the secondary optics assembly in front of the vehicle to create a plurality of partial light distributions, and overall light distribution of the projection module results from overlapping of the partial light distributions and the secondary optics assembly projects the irradiation passing by the baffle in front of the vehicle, and projects the upper edge as the light-dark line onto the roadway in front of the vehicle.

2. Projection module as in claim 1, characterized in that the primary optics assembly includes at least one front optical system positioned in the beam path of the irradiation emitted from the light sources, and which bundles the emitted irradiation by means of total reflection.

3. Projection module as in claim 2, characterized in that its own front optical system is assigned to each of the light sources.

4. Projection module as in claim 3, characterized in that the lens segments of the secondary optics assembly are various segments of the same projection lens.

5. Projection module as in claim 3, characterized in that the lens segments of the secondary optics assembly are various segments of differently-shaped projection lenses.

6. Projection module as in claim 2, characterized in that the lens segments of the secondary optics assembly are various segments of the same projection lens.

7. Projection module as in claim 2, characterized in that the lens segments of the secondary optics assembly are various segments of differently-shaped projection lenses.

8. Projection module as in claim 1, characterized in that the lens segments of the secondary optics assembly are various segments of the same projection lens.

9. Projection module as in claim 8, characterized in that the lens segments of the secondary optics assembly possess identical focal lengths.

10. Projection module as in claim 9, characterized in that the thickness of at least one of the lens segments of the secondary optics assembly positioned near or in the vicinity of the optical axis of the projection module is thinner in comparison to the lens segments positioned farther away from the optical axis.

11. Projection module as in claim 9, characterized in that the lens segments of the secondary optics assembly are positioned in an array facing opposite the exit direction of the irradiation from the projection module.

12. Projection module as in claim 8, characterized in that the lens segments of the secondary optics assembly possess different focal lengths.

13. Projection module as in claim 12, characterized in that the focal lengths are selected such that that the lens segments positioned according to their focal lengths, as viewed from above, follow a contour of the vehicle headlight and/or contour of a cover plate of the headlight.

14. Projection module as in claim 1, characterized in that the lens segments of the secondary optics assembly are various segments of differently-shaped projection lenses.

15. Projection module as in claim 14, characterized in that the lens segments of the secondary optics assembly possess the same focal lengths.

16. Projection module as in claim 14, characterized in that the lens segments of the secondary optics assembly possess different focal lengths.

17. Projection module as in claim 1, characterized in that the primary optics assembly includes at least one front optical system positioned in the beam path of the irradiation emitted from the light sources, and bundles the emitted irradiation by means of total reflection.

* * * * *